United States Patent [19]
Montgomery

[11] 3,778,605
[45] Dec. 11, 1973

[54] DIGITAL EXPANDOR FOR PCM CODE WORDS

[75] Inventor: William Lloyd Montgomery, Little Silver, N.J.

[73] Assignee: Bell Telephone Laboratories, Incorporated, Murray Hill, Berkeley Heights, N.J.

[22] Filed: Apr. 16, 1971

[21] Appl. No.: 134,704

[52] U.S. Cl. ............ 235/154, 325/62, 340/347 DD
[51] Int. Cl. ............ H04l 3/00
[58] Field of Search .................. 179/15 AV, 15 AL, 179/1 CN, 18 BC, 15.55; 340/347 DD; 333/14; 325/62; 235/154

[56] References Cited

UNITED STATES PATENTS

| | | | |
|---|---|---|---|
| 3,594,560 | 7/1971 | Stanley | 235/154 |
| 3,694,639 | 9/1972 | Deschenes et al. | 340/347 DD X |
| 3,180,939 | 4/1965 | Hall | 179/15 AV |
| 3,366,947 | 1/1968 | Kawashima et al. | 333/14 |
| 3,564,415 | 2/1971 | Brolin et al. | 333/14 |
| 3,575,591 | 4/1971 | Chatelon et al. | 333/14 |

*Primary Examiner*—Thomas J. Sloyan
*Attorney*—William L. Keefauver

[57] ABSTRACT

Compressed PCM digital code words having the serial form SABCWXYZ are expanded in accordance with a prescribed format. A control signal is generated in response to the binary number represented by the logical signals in the ABC bit positions. The control signal, in turn, is utilized to read the logical signals in the serial WXYZ bit positions directly into selected stages of a storage register and to supply a predetermined logical signal to other stages of the storage register, thereby completing the expanded digital code word in accordance with the expansion format.

13 Claims, 8 Drawing Figures

INVENTOR
W. L. MONTGOMERY
BY Thomas Stafford
ATTORNEY

FIG. 2

PCM CODE WORD — EXPANDED MU-LAW WORD OUTPUT OF REGISTER 380 FIG. 3

| S | A | B | C | W | X | Y | Z | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|---|---|---|---|---|
| S | 0 | 0 | 0 | W | X | Y | Z | 0 | 0 | 0 | 0 | 0 | 0 | 0 | S | 1 | W | X | Y | Z | .0 |
| S | 0 | 0 | 1 | W | X | Y | Z | 0 | 0 | 0 | 0 | 0 | 0 | S | 1 | W | X | Y | Z | 0 | .1 |
| S | 0 | 1 | 0 | W | X | Y | Z | 0 | 0 | 0 | 0 | 0 | S | 1 | W | X | Y | Z | 0 | 1 | .1 |
| S | 0 | 1 | 1 | W | X | Y | Z | 0 | 0 | 0 | 0 | S | 1 | W | X | Y | Z | 0 | 1 | 1 | .1 |
| S | 1 | 0 | 0 | W | X | Y | Z | 0 | 0 | 0 | S | 1 | W | X | Y | Z | 0 | 1 | 1 | 1 | .1 |
| S | 1 | 0 | 1 | W | X | Y | Z | 0 | 0 | S | 1 | W | X | Y | Z | 0 | 1 | 1 | 1 | 1 | .1 |
| S | 1 | 1 | 0 | W | X | Y | Z | 0 | S | 1 | W | X | Y | Z | 0 | 1 | 1 | 1 | 1 | 1 | .1 |
| S | 1 | 1 | 1 | W | X | Y | Z | S | 1 | W | X | Y | Z | 0 | 1 | 1 | 1 | 1 | 1 | 1 | .1 |

FIG. 5

ABC BITS OF PCM CODE WORD — OUTPUT OF LOGIC GATES 350

| A | B | C | 1 | 2 | 3 | 4 | 5 | 6 | 7 | 8 |
|---|---|---|---|---|---|---|---|---|---|---|
| 0 | 0 | 0 | 0 | 0 | 0 | 0 | 0 | 0 | 0 | 1 |
| 0 | 0 | 1 | 0 | 0 | 0 | 0 | 0 | 0 | 1 | 0 |
| 0 | 1 | 0 | 0 | 0 | 0 | 0 | 0 | 1 | 0 | 0 |
| 0 | 1 | 1 | 0 | 0 | 0 | 0 | 1 | 0 | 0 | 0 |
| 1 | 0 | 0 | 0 | 0 | 0 | 1 | 0 | 0 | 0 | 0 |
| 1 | 0 | 1 | 0 | 0 | 1 | 0 | 0 | 0 | 0 | 0 |
| 1 | 1 | 0 | 0 | 1 | 0 | 0 | 0 | 0 | 0 | 0 |
| 1 | 1 | 1 | 1 | 0 | 0 | 0 | 0 | 0 | 0 | 0 |

FIG. 7

PCM CODE WORD — EXPANDED A-LAW WORD OUTPUT OF REGISTER 420 FIG. 7

| S | A | B | C | W | X | Y | Z | 1 | 2 | 3 | 4 | 5 | 6 | 7 | 8 | 9 | 10 | 11 | 12 | 13 |
|---|---|---|---|---|---|---|---|---|---|---|---|---|---|---|---|---|---|---|---|---|
| S | 0 | 0 | 0 | W | X | Y | Z | 0 | 0 | 0 | 0 | 0 | 0 | 0 | S | W | X | Y | Z | .1 |
| S | 0 | 0 | 1 | W | X | Y | Z | 0 | 0 | 0 | 0 | 0 | 0 | S | 1 | W | X | Y | Z | .1 |
| S | 0 | 1 | 0 | W | X | Y | Z | 0 | 0 | 0 | 0 | 0 | S | 1 | W | X | Y | Z | 1 | .0 |
| S | 0 | 1 | 1 | W | X | Y | Z | 0 | 0 | 0 | 0 | S | 1 | W | X | Y | Z | 1 | 0 | .0 |
| S | 1 | 0 | 0 | W | X | Y | Z | 0 | 0 | 0 | S | 1 | W | X | Y | Z | 1 | 0 | 0 | .0 |
| S | 1 | 0 | 1 | W | X | Y | Z | 0 | 0 | S | 1 | W | X | Y | Z | 1 | 0 | 0 | 0 | .0 |
| S | 1 | 1 | 0 | W | X | Y | Z | 0 | S | 1 | W | X | Y | Z | 1 | 0 | 0 | 0 | 0 | .0 |
| S | 1 | 1 | 0 | W | X | Y | Z | S | 1 | W | X | Y | Z | 1 | 0 | 0 | 0 | 0 | 0 | .0 |

DIGITAL EXPANDOR FOR PCM CODE WORDS

BACKGROUND OF THE INVENTION

This invention relates to digital signal processing and, more particularly, to digital expandors for processing nonlinear digital code words.

In digital communications systems, analog information signals are encoded into digital code words, transmitted over a time divided transmission facility and decoded at a receiver. One such communications system employs pulse code modulation (PCM). As is well known in pulse code modulation systems, encoding involves converting the value of the instantaneous amplitude of a periodically sampled and quantized analog signal into binary code words.

The advantages of the PCM transmission systems are numerous and are well known in the art. However, quantizing of the analog signal results in distortion because discrete quantum levels are utilized which cannot exactly match the instantaneous amplitudes of all the analog signal samples. The effect of this distortion, called quantizing noise, is minimized for a fixed number of bits per PCM word by employing nonuniform quantizing schemes. In all of these schemes, the quantizing signal steps are effectively made smaller for the lower amplitude signal samples and larger for the higher amplitude signal samples. This technique, commonly referred to as "compression," is effective in reducing the quantizing noise at the lower signal levels where it is most objectionable while increasing the quantizing noise at the higher signal levels where it may be tolerated.

Since PCM encoding yields digital code words representing a compressed analog signal which is nonlinear, the digital code words are also nonlinear. Thus, reconstruction of the original analog signal at the receiver necessarily involves nonlinear processing of either the received digital code words or the decoded analog signal. This processing is commonly referred to as "expansion."

Historically, compression of the analog signals was effected prior to encoding and expansion was effected subsequent to decoding. In later systems, the compression and encoding operations were combined to yield nonlinear code words directly, and the decoding and expansion operations were combined to yield linear analog signals directly. In all of these systems, however, analog signal quantities are converted to digital quantities in the compression process, while digital quantities are converted to analog quantities in the expansion process.

More recently, digital processing systems have been proposed which operate to convert from one digital signal quantity to another digital signal quantity. That is to say, all processing is done in the digital domain. In one such system, nonlinear PCM code words are expanded to linear digital code words. To accomplish this conversion individual PCM code words propagating in serial form are first converted to parallel code words. Logical signals in selected ones of the bit positions of the parallel code words are then read into a counter circuit, while the logical signals in the remaining ones of the bit positions of the parallel code words and a logical signal representing the most significant digit in the individual code words are read into a shift register. Then, the entire group of logical signals stored in the register is shifted in accordance with clock pulses supplied to the counter circuit. A logic circuit is employed to control the clock pulses supplied to the counter and to determine which of the digits in the shift register should be read out to form the expanded digital word.

Although such prior digital expansion systems may be advantageously employed in some applications, they are undesirable in others because of circuit complexity and because of the time consumed in converting the serial code words to parallel code words and then in shifting the entire group of logical signals stored in a shift register a plurality of times in order to effect the desired expansion.

SUMMARY OF THE INVENTION

These and other problems are resolved in a digital expandor circuit which operates to convert digital code words, representative of amplitude samples in a nonlinear code scheme, to expanded digital code words in accordance with a prescribed format.

Digital code words, representative of amplitude samples on a "compressed" scale, each having a plurality of bits propagating in serial form are expanded, in accordance with this invention, by reading directly into a storage device the logical signals in selected ones of the bit positions of the code word being expanded. This is achieved by first generating a control signal in response to logical signals in predetermined bit positions of the code word being expanded. In turn, the control signal is utilized to supply directly logical signals in the remaining ones of the bit positions of the code word being expanded to predetermined stages of a storage device. Additional predetermined logical signals are supplied to others of the stages of the storage device to complete the expanded code word in accordance with a prescribed expansion format.

Generally, pulse code modulation (PCM) code words representing the amplitude of a signal sample are serially transmitted and have the form SABCWXYZ. The S bit represents the sign of the signal sample, the ABC bits represent a binary number related to the location of the signal sample in a particular segment of the companding law being utilized and the WXYZ bits represent the position of the particular signal sample within the segment. Thus, in accordance with the invention, a serial PCM code word is expanded by first supplying the logical signals in the ABC bit positions of the code word to a serial-to-parallel converter. Logic circuits supplied with the parallel logical signals in the ABC bit positions operate to generate a control signal representative of a predetermined logical signal, for example, a logical 1. The control signal, in turn, is supplied to a selected stage of a shift register determined in accordance with the binary number represented by the ABC bits. Individual stages of the shift register are coupled via AND gates in a one-to-one relationship to selected stages of a storage register. The WXYZ bits of the PCM code word being expanded are supplied in serial form to a first input of each of the AND gates. The control signal is initially supplied to a second input of one of the AND gates corresponding to the shift register stage in which the control signal is initially stored. Accordingly, the logical signal in the W bit position is supplied, via the particular AND gate made operative by the control signal, to a selected stage of the storage register in accordance with the expansion format. Then, by selectively advancing the control signal to subsequent stages in the shift register and, hence, to subsequent AND gates, the logical signals in the XYZ bit positions of the code word being expanded are individually read into selected stages of the storage register. Additional circuits operate in response to the control signal to supply predetermined logical signals to other stages of the storage register to complete the expansion of the PCM code word.

A feature of the instant invention, therefore, is the substantially instantaneous expansion of a serial PCM digital code word as it is read directly into a storage register.

BRIEF DESCRIPTION OF THE DRAWINGS

These and other objects and advantages of the invention will be more fully understood from the following detailed description taken in conjunction with the appended drawings wherein:

FIG. 2 is a table summarizing the expansion of mu-law PCM code words;

FIG. 5 is a table summarizing outputs of logic gates utilized in the invention;

FIG. 7 is a table summarizing the expansion of A-law PCM code words; and

DETAILED DESCRIPTION

Digital transmission of analog information involves converting analog signals into digital code words. For this purpose, numerous code schemes have been devised using code words having any number of bits. For example, code schemes using seven-bit and eight-bit code words are well known in the art. Two encoding schemes of particular interest are commonly referred to as the mu-law code and the A-law code. Both of these codes presently utilize eight-bit code words and are employed in Pulse Code Modulation (PCM) transmission systems. Each eight-bit code word used in both the mu-law and A-law codes includes a sign bit S, location bits ABC and position bits WXYZ.

Figure 1:
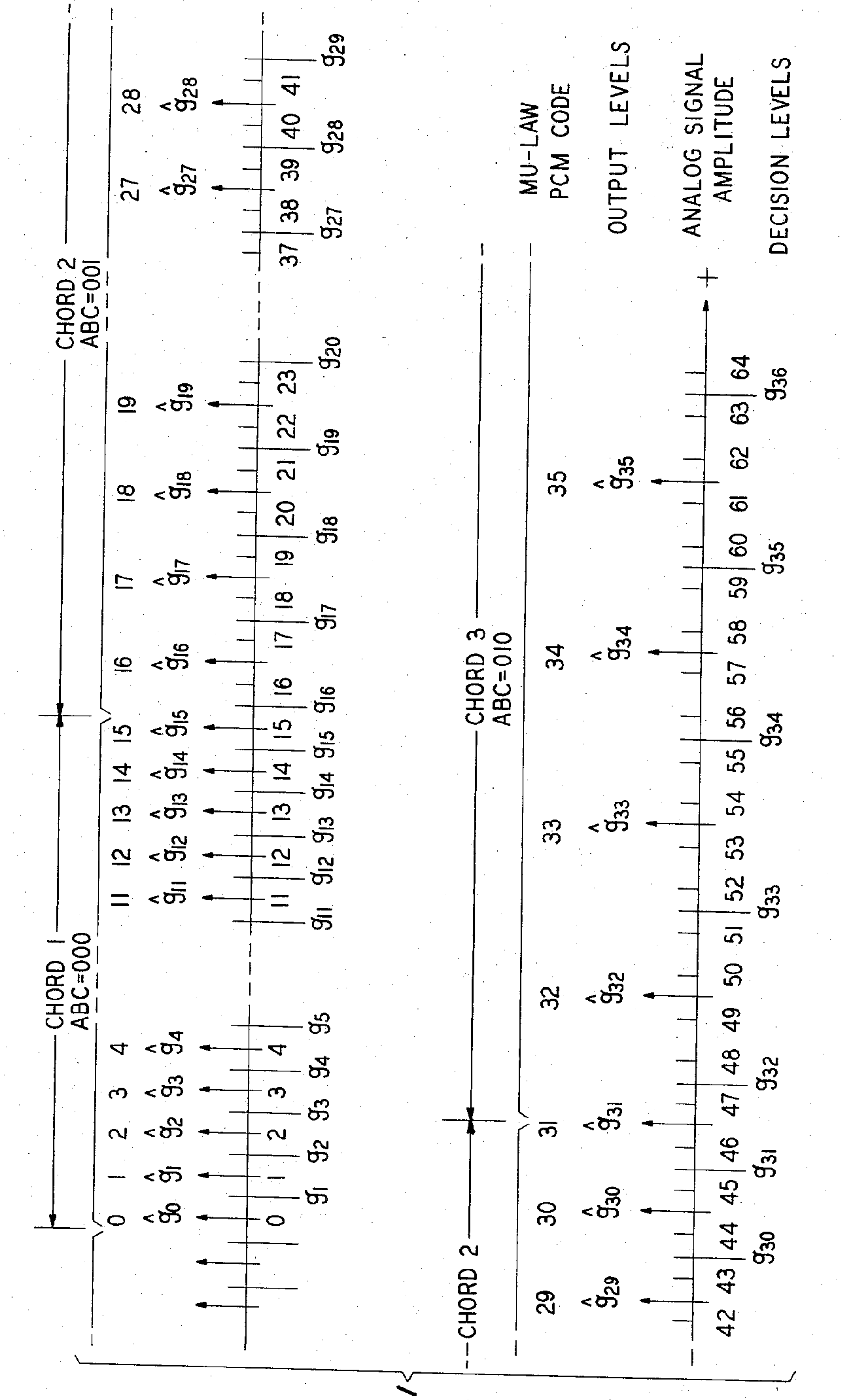
FIG. 1 is a graphical representation of an eight-bit mu-law PCM encoding scheme.

FIG. 1 is a detailed characterization of an eight-bit mu-law encoding scheme. When taken in combination with equations 1–3 shown below, the complete mu-law code is rigorously specified. The horizontal axis in FIG. 1 represents the analog signal amplitude positive going to the right. Along this analog amplitude scale are spaced decision levels $g_i$ and output levels $\hat{g}_i$. For simplicity, negative values are not shown because they differ only in sign from the positive values.

The physical interpretation of decision levels and output levels in the mu-law code is as follows: An analog signal amplitude falling between decision levels $g_i$ and $g_{i+1}$ is represented by quantized amplitude $\hat{g}_i$. Amplitude $\hat{g}_i$, in turn, is represented by subscript $i$, which in eight-bit binary form is the transmitted mu-law PCM signal. For example, $i$=19 (binary 10011) represents any signal sample having an amplitude between the limits of 21.5 and 23.5, quantized to the value of 22.5. Thus any signal sample having an amplitude within the range of 21.5 to 23.5 is encoded for transmission as a mu-law code word SABCWXYZ = S0010011.

It should be noted that in existing systems binary signals are not transmitted in the strict sense of the word, "binary." The binary words are used to generate a desired line signal. However, for convenience without loss of generality, we will assume the transmission of binary code words.

Note that for increasing values of ABC, output levels $\hat{g}_i$ (FIG. 1) are separated by uniformly increasing amounts resulting in a nonlinear scale. It is this nonlinearity which requires that the digital code word be expanded before performing other digital processing, for example, multiplication, division and the like.

Each value of ABC represents a "chord" for the mu-law code. A chord may be defined as a set of equally spaced output levels. There are sixteen chords, eight each for positive and negative signals in the mu-law encoding scheme, though only three positive going chords are shown in FIG. 1 for brevity. Since output level $\hat{g}_i$ spacing is equal in the first chord for each sign, these two chords are generally considered combined into a single "segment." This encoding scheme is therefore frequently referred to in the literature as 15-segment mu-law encoding. WXYZ represents a "position code" which identifies the position on the segment of the corresponding output level. S is the sign of the analog sample.

Equations 1–3 below complete the specification of the eight-bit mu-law code.

$$j=1 \quad g_i = i - 0.5 \quad i = 1,2,\ldots,15$$
$$j=2 \quad g_i = 2i - 16.5 \quad i = 16,17,\ldots,31$$
$$j=3 \quad g_i = 4i - 80.5 \quad i = 32,33,\ldots,47$$
$$j=4 \quad g_i = 8i - 272.5 \quad i = 48,49,\ldots,63$$
$$j=5 \quad g_i = 16i - 784.5 \quad i = 64,65,\ldots,79 \qquad (1)$$

$$j=6 \quad g_i = 32i - 2{,}064.5 \quad i = 80,81,\ldots,95$$
$$j=7 \quad g_i = 64i - 5{,}136.5 \quad i = 96,97,\ldots,111$$
$$j=8 \quad g_i = 128i - 12304.5 \quad i = 112,113,\ldots,128$$
$$\hat{g}_i = g_i + 2^{(j-2)} \quad i = 1,2,\ldots,127 \qquad (2)$$

$$\hat{g}_o = 0 \qquad (3)$$

For each chord $j$, equation 1 specifies decision levels $g_i$ appearing in that chord. Equation 2 specifies output levels $\hat{g}_i$ in terms of decision levels $g_i$ and chord number $j$ for mu-law encoding.

Equation 3 defines output level $\hat{g}_o$=0. This identifies the encoding scheme of FIG. 1 as being of "mid-tread" design, in contrast to "mid-riser" design to be discussed below in conjunction with the A-law code. Mid-tread design occurs when an input analog signal of zero amplitude generates a decoded output level of zero amplitude, i.e., $\hat{g}_o = 0$; whereas, mid-riser design generates a non-zero decoded output level, i.e., $\hat{g}_o \neq 0$.

Numerous level and output assignments are possible, each defining another mu-law code family. No attempt will be made to enumerate the many possible combinations, it being understood that a large class of codes may be expanded by the instant invention.

Of particular interest is the family of fifteen segment mu-law codes. The general representation of any code in this family is $SABCX_1X_2 \ldots X_n$, $n \geq 1$. Each chord may therefore be subdivided into any number of position codes which is a power of two, thereby changing the total number of encoding bits. The eight-bit code described by equations 1, 2 and 3, uses only four position code bits; however, the expansion performed by this invention may also be performed on, for example, the six-bit code characterized by the bits SABCWX or the 10-bit code characterized by the bits $SABCX_1X_2X_3X_4X_5X_6$. Although this invention may be utilized to expand mu-law code words having any number of bits for simplicity and clarity of description, the present invention is hereafter described in systems which employ eight-bit code words.

FIG. 2 depicts a summary of expanded code words for PCM code words occurring in the eight-bit mu-law code. Although sign bit S is shown in the expansion, for particular applications only the ABCWXYZ bits are utilized because they are the same for both positive and negative signals. Each of the expanded mu-law digital code words represents a linear code word plus binary 16. Thus, if needed, a linear code word rather than an expanded word is generated simply by subtracting binary 16 (10000) from the expanded words shown in FIG. 2. Consider a simple example: assuming that an eight-bit mu-law PCM code word —neglecting its sign— is ABCWXYZ = 0011110. From FIG. 1 it is seen that this code word corresponds to decimal value $i = 30$ which represents output level $g_{30}$ = 44.5. The corresponding expanded code word (FIG. 2) —again neglecting its sign— is 1WXYZ0.1 = 111100.1. Subtracting binary 16, i.e., 10000, from the expanded word yields 101100.1 which represents an output level of 44.5.

Figure 3:
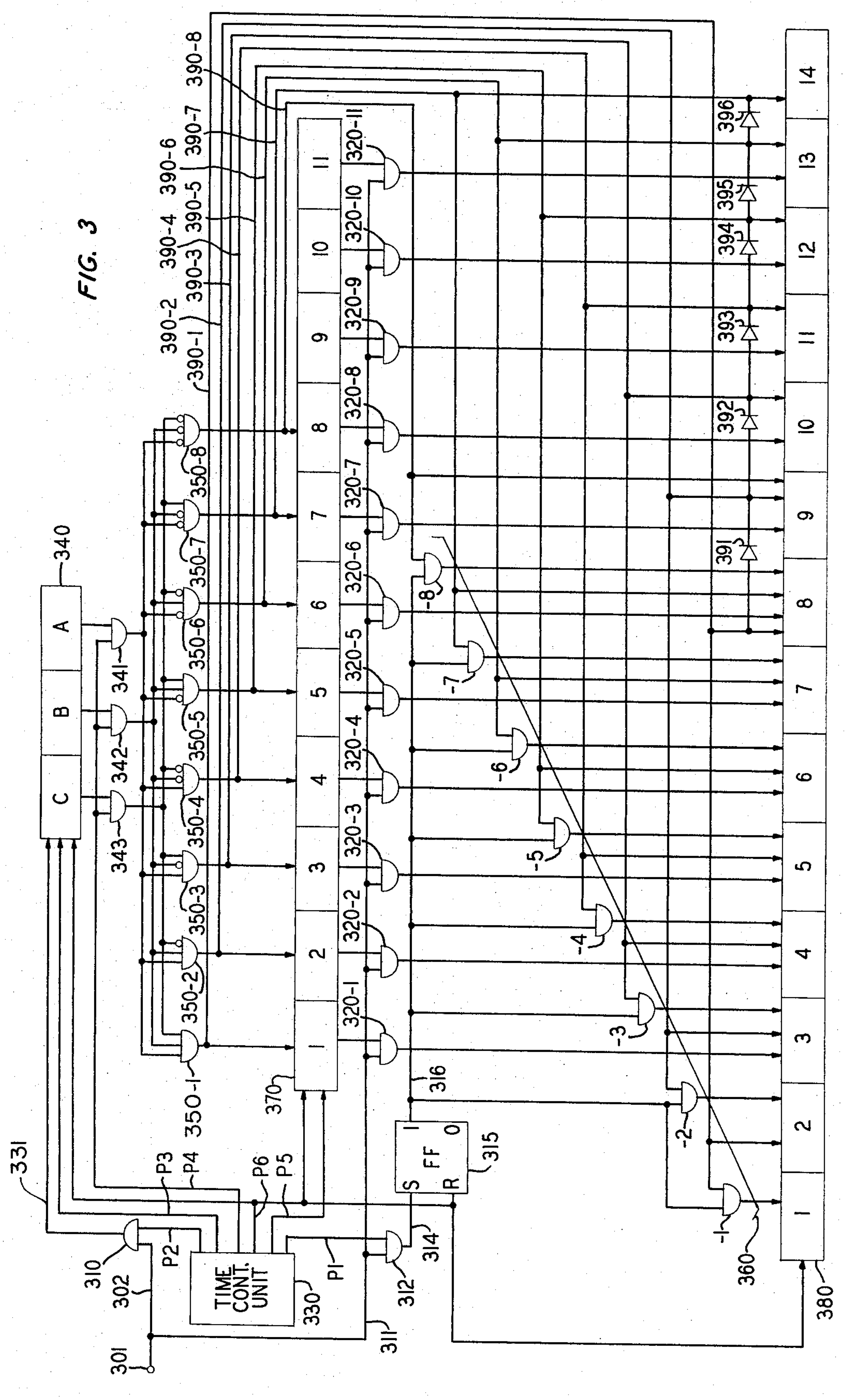
FIG. 3 depicts an expandor circuit illustrating one embodiment of the invention for expanding mu-law PCM code words.
Figure 4:
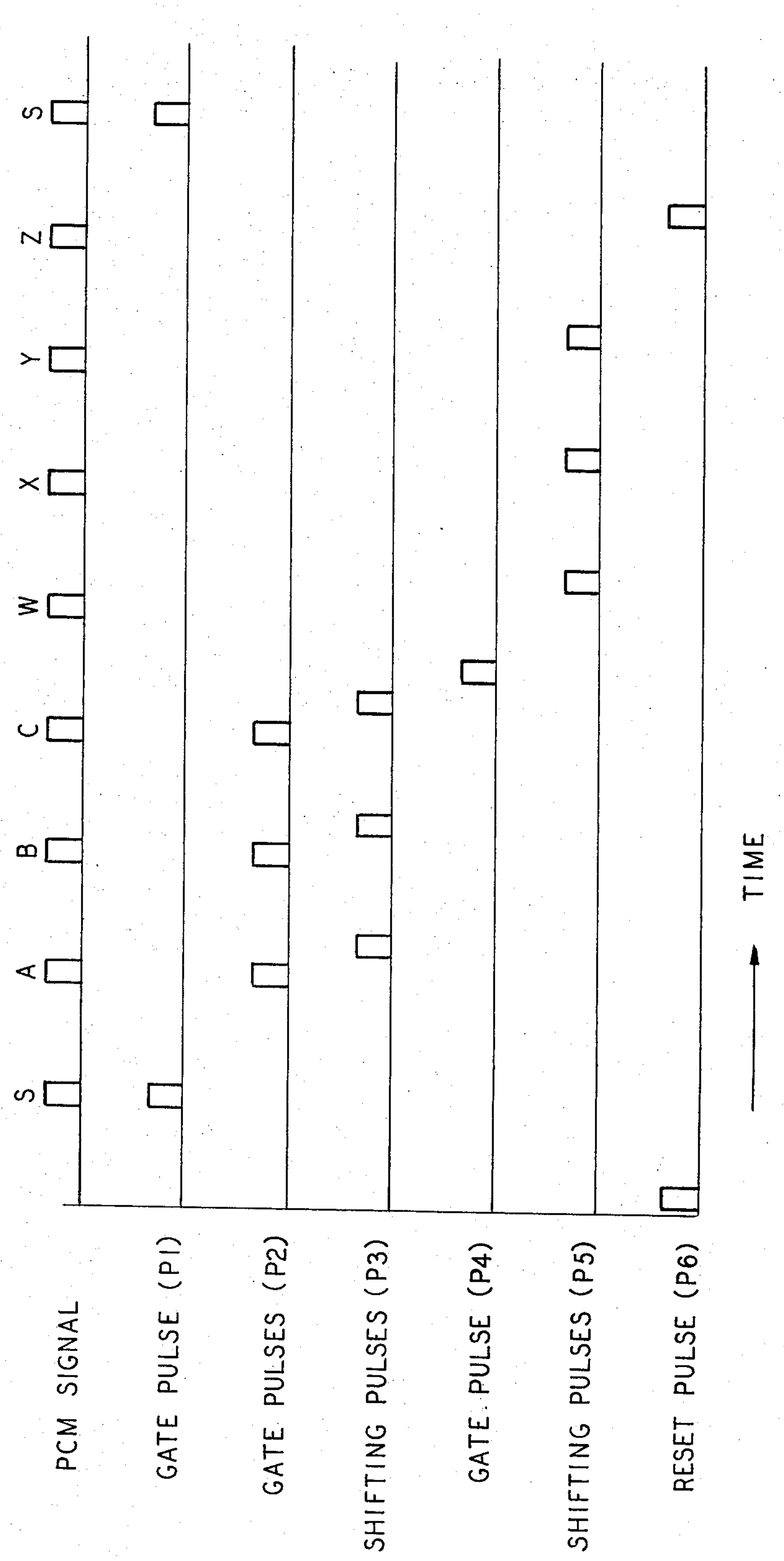
FIG. 4 is a graphical representation of a timing sequence useful in describing the invention.

FIG. 3 depicts in simpified block diagram form a system illustrating the present invention, which operates to expand eight-bit mu-law PCM code words. PCM code words including SABCWXYZ bits propagating in serial form at a predetermined bit rate, for example, 1.544 million bits per second, are supplied via terminal 301 and circuit path 302 to a first input of AND gate 310 and via circuit path 311 to a first input of AND gate 312 and to a first input of AND gates 320. Pulse signal P1 generated in well-known fashion in timing control unit 330 is supplied to a second input of AND gate 312. As shown in FIG. 4, gate pulse P1 is generated at a predetermined instant coincident with the S bit of the PCM code word being expanded. Accordingly, the logical signal in the S bit position is supplied via circuit path 314 (FIG. 3) to the SET input of flip-flop 315. Flip-flop 315 operates to store the logical signal in the S bit position for later use and is discussed below.

Pulse signals P2, also generated in well-known fashion in timing control unit 330, are supplied to a second input of AND gate 310. Again referring to FIG. 4, it is seen that gate pulses P2 are generated and supplied to gate 310 (FIG. 3) at predetermined instants coincident with the serial ABC bits of the PCM code word being expanded. Thus, the logical signals in the ABC bit positions are serially supplied via circuit path 331 to shift register 340. Pulse signals P3 (FIG. 4) generated in timing control unit 330 at predetermined instants, are supplied to register 340 for advancing the logical signals in the ABC bit positions to predetermined stages. Register 340 may be any one of the numerous shift registers known in the art having the capacity of advancing logical signals at the PCM rate of 1.544 million bits per second.

The output stages of register 340 are coupled in a one-to-one relationship to a first input of AND gates 341, 342 and 343. Pulse signal P4 (FIG. 4), generated in timing control unit 330, is supplied to a second input of AND gates 341, 342 and 343 for transferring the logical signals stored in register 340 to selected inputs of logic gates 350–1 through 350–8. Pulse P4 must be generated prior to the occurrence of the W bit of the PCM code word and subsequent to advancing the ABC bits in register 340.

Logic gates 350 operate in response to the logical signals in the ABC bits to generate a control signal representative of a predetermined logical signal, for example, a logical 1. FIG. 5 illustrates a summary of the outputs possible from gates 350 for the several combinations of logical signals in the ABC bit positions of PCM code words. Accordingly, gate 350–1 responds only to ABC=111 to generate a logical 1 at its output. Gate 350–2 has an inverting input to which the C bit is supplied. Therefore, gate 350–2 responds only to ABC=110 to generate a logical 1. Gate 350–3 has an inverting input to which the B bit is supplied. Thus, gate 350–3 responds only to ABC=101 to generate a logical 1. Similarly, gate 350–4 responds only to ABC=100, gate 350–5 responds only to ABC=011, gate 350–6 to ABC=010, gate 350–7 to ABC=001 and gate 350–8 to ABC=000 to generate a logical 1 at their respective outputs.

The outputs of gates 350–1 through 350–8 are connected in a one-to-one relationship to stages 1 through 8, respectively, of shift register 370. Therefore, gates 350 operate to supply the control signal, i.e., a logical 1, to an individual one of stages 1–8 of register 370 in accordance with the binary number represented by the logical signals in bits ABC. Again FIG. 5 summarizes the inputs to register 370 for the several binary number combinations represented by the ABC bits.

Outputs of stages 1–11 of register 370 are connected in a one-to-one relationship to a second input of AND gates 320–1 through 320–11. In turn, the outputs of AND gates 320–1 through 320–11 are connected in a one-to-one relationship to stages 3–11 of register 380. As mentioned above, the bits of the PCM code word being expanded are serially supplied to a first input of AND gates 320–1 through 320–11. However, AND gates 320 are inhibited until the control signal generated by logic gates 350 is supplied to a selected stage of register 370 and, hence, to one of AND gates 320. Thus, AND gates 320 are inoperative to pass logical signals in the bit positions of the code word being expanded until after the occurrence of the C bit and just prior to when the logical signal in the W bit position is supplied to their inputs. Then, since the logical signal in the W bit position is coincident with the control signal supplied to one of AND gates 320, the logical signal in the W bit is supplied to a stage of register 380 associated with the particular one of AND gates 320 to which the control signal has been supplied. Pulse signals P5 (FIG. 4) generated in timing control unit 330 (FIG. 3) are supplied to register 370 for advancing the control signal to subsequent stages of register 370. Thus, the next one of AND gates 320 is activated to supply the logical signal in the X bit position to a selected stage of register 380. Similarly, register 370 is advanced by pulses P5 to supply the logical signals in the Y and Z bits to individual stages of register 380.

The outputs of gates 350–1 through 350–8 are also coupled to selected stages of register 380 and to a first input of AND gates 360–1 through 380–8, respectively. Specifically, the output of gate 350–1 is supplied via circuit path 390–1 to stages 2 and 8 of register 380 and to a first input of AND gate 360–1 and via gating diodes 391–396 to stages 9–14 of register 380. The output of gate 350–2 is supplied via circuit path 390–2 to stages 3 and 9 of register 380 and to a first input of AND gate 360–2 and via gating diodes 392–396 to stages 10–14 of register 380. The output of gate 350–3 is supplied via circuit path 390–3 to stages 4 and 10 of register 380 and to a first input of AND gate 360–3 and via gating diodes 393–396 to stages 11–14 of register 380. The output of gate 350–4 is supplied via circuit path 390–4 to stages 5 and 11 of register 380 and to a first input of AND gate 360–4, and via gating diodes 394–396 to stages 12–14 of register 380. The output of gate 350–5 is supplied via circuit path 390–5 to stages 6 and 12 of register 380 and to a first input of AND gate 360–5, and via gating diodes 395 and 396 to stages 13 and 14 of register 380. The output of gate 350–6 is supplied via circuit path 390–6 to stages 7 and 13 of register 380 and to a first input of AND gate 360–6, and via gating diode 396 to stage 14 of register 380. The output of gate 350–7 is supplied via circuit path 390–7 to stages 8 and 14 of register 380 and to a first input of AND gate 360–7. Finally, the output of gate 350–8 is supplied via circuit path 390–8 to stage 9 of register 380 and to a first input of AND gate 360–8.

Circuit paths 390–1 through 390–8 and gating diodes 391 through 396 operate to supply a signal representative of a logical 1 to selected stages of register 380 in accordance with the prescribed mu-law expansion format. Although gating diodes are used in this example, numerous other unidirectional conducting or isolation devices capable of generating a logical 1 at their output may be employed, for example, OR gates.

In this example, AND gates 360–1 through 360–8 are employed to supply the logical signal in the S bit position of the code word being expanded to an appropriate one of the stages of register 380. In some applications, however, it is desirable to "carry" the S bit external to the "expanded" code word. As discussed above, the logical signal in the S bit position of the code word being expanded is stored in flip-flop 315. The output of flip-flop 315 is supplied via circuit path 316 to a second input of AND gates 360–1 through 360–8. Since the control signal generated by logic gates 350 is supplied to the first input of AND gates 360, only a selected one of gates 360 is activated to supply the logical signal in the S bit to a predetermined stage of register 380 in accordance with the expansion format. FIG. 2 summarizes the placement of logical signals in the S bit position in the stages of register 380 for the several mu-law code words. As mentioned above, in some applications the signal in the S bit is not required. Therefore, AND gate 312, flip-flop 315 and AND gates 360, along with the associated circuit connections may be eliminated in those applications not requiring use of the S bit.

As shown in FIG. 3, a plurality of inputs are supplied to individual ones of the stages of register 380. To provide isolation between these inputs, OR gates (not shown) are utilized, which may be included in the individual stages of register 380.

Operation of this invention in expanding mu-law PCM code words is best explained by way of a simple example. Initially, registers 340, 370 and 380 and flip-flop 315 are reset to a low state, i.e., representative of a logical 0, by pulse P6 (FIG. 4). Now, consider the PCM code word SABCWXYZ = 00111110. The bits of this code word are supplied in serial form to terminal 301 (FIG. 3) and then via circuit path 302 to AND gate 310 and via circuit path 311 to AND gates 320 and AND gate 312. Gate pulse P1 (FIG. 4) is supplied to AND gate 312 coincident with the S bit. Since the logical signal in the S bit represents a logical zero, the output of AND gate 312 remains low and, hence, the output of flip-flop 315 also remains in its initial low state. Accordingly, AND gates 360–1 through 360–8 are all inhibited.

Gate pulses P2 (FIG. 4) are supplied to AND gate 310 (FIG. 3). Since pulses P2 are coincident with the ABC bits, the logical signals in the ABC bits, namely 011, are supplied to shift register 340. These logical signals are advanced to appropriate stages in register 340 by shifting pulses P3 (FIG. 4). Accordingly, the signal in stage A of register 340 is a logical 0, the signal in stage B is a logical 1 and the signal in stage C is a logical 1. These logical signals are transferred to logic gates 350–1 through 350–8 when gate pulse P4 (FIG. 4) is supplied to AND gates 341, 342 and 343. Since ABC=011, only gate 350–5 is operative to generate a control signal representative of a logical 1 at its output. This control signal, i.e., a logical 1 is supplied to stage 5 of shift register 370, to stages 6 and 12 of register 380 via circuit path 390–7 and to stages 13 and 14 of register 380 via diodes 395 and 396. The output of stage 5 of register 370 is also supplied to one input of AND gate 320–5. Therefore, a logical 1 is supplied to one input of AND gate 320–5 after the occurrence of the C bit and before the occurrence of the W bit of the code word being expanded. Thus, AND gate 320–5 is operative to supply the logical signal in the W bit, in this example, a logical 1, to stage 7 of register 380. After the occurrence of the W bit, the control signal stored in stage 5 of register 370 is advanced one stage to the right, i.e., to stage 6, by shifting pulses P5 (FIG. 4). AND gate 320–6 is activated by the control signal and the logical signal in the X bit position, in this example a logical 1, is supplied to stage 8 of register 380. Then, the control signal is advanced to stage 7 of register 370 and AND gate 320–7 is made operative to supply the logical signal in the Y bit, a logical 1, to stage 9 of register 380. Again, pulse signal P5 advances the control signal to stage 8 of register 370 and AND gate 320–8 is made operative to supply the logical signal in the Z bit, in this example a logical 0, to stage 10 of register 380. Since the signal in the Z bit represents a logical 0, AND gate 320–8 does not respond to generate a logical 1 at its output and, hence, stage 10 of register 380 retains its initial low state. That is to say, the signal in stage 10 of register 380 represents a logical 0. Similarly, stage 11 of register 380 in this example also retains its initial low state because no signal was supplied to it. Thus, the mu-law PCM code word is expanded in accordance with the invention, as the logical signals in the serial WXYZ bits are read directly into register 380. Accordingly, the logical signals stored in stages 5–14 register 380 represent the desired expanded mu-law PCM code word S1WXYZ011.1=011110011.1, which corresponds to the transmitted mu-law PCM code word SABCWXYZ=00111110 as shown in FIG. 2. The expanded digital code word stored in register 380 may be utilized as desired. For example, it may be converted into a linear code word by subtracting logical 16.

A-Law Expandor

Figure 6:
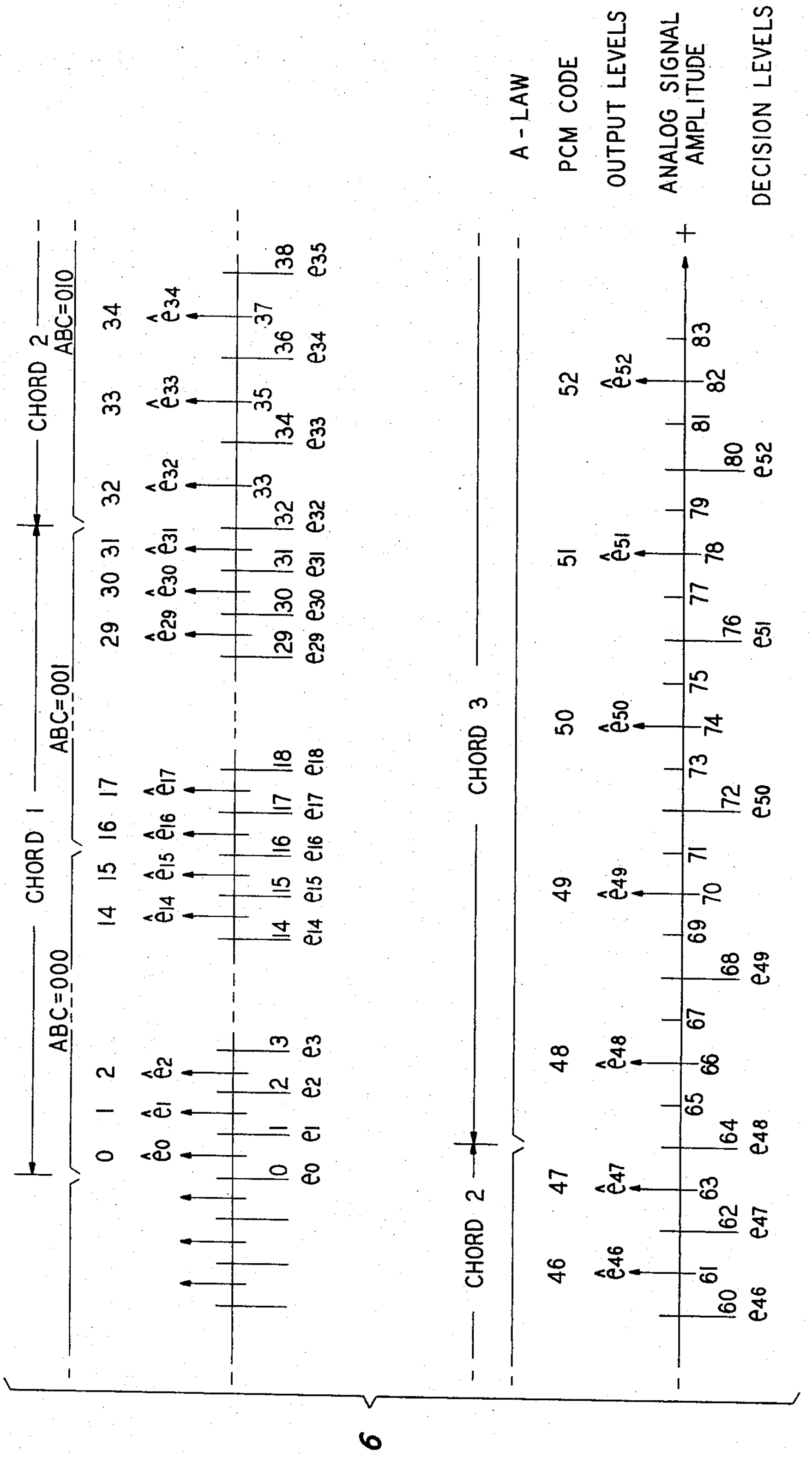
FIG. 6 is a graphical representation of an eight-bit A-law PCM encoding scheme.

FIG. 6 is a detailed characterization of an eight-bit A-law encoding scheme. The horizontal axis in FIG. 6 represents the analog signal amplitude positive going to the right. Along this axis are spaced decision levels $e_i$ and output levels $\hat{e}_i$. Equations 4 and 5 below complete the specification of the eight-bit A-law code.

$$
\begin{array}{lll}
j=1 & e_i=i & i=0,1,2,\ldots,31 \\
j=2 & e_i=2i-32 & i=32,33,\ldots,47 \\
j=3 & e_i=4i-128 & i=48,49,\ldots,63 \\
j=4 & e_i=8i-384 & i=64,65,\ldots,79 \\
j=5 & e_i=16i-1,024 & i=80,81,\ldots,95 \\
j=6 & e_i=32i-2,560 & i=96,97,\ldots,111 \\
j=7 & e_i=64i-6,144 & i=112,113,\ldots,128
\end{array} \quad (4)
$$

$$\hat{e}_i=e_i+2^{(j-2)} \quad j=1,2,\ldots,7 \quad i=0,1,2,\ldots,127 \quad (5)$$

Equation 4 specifies decision levels $e_i$ appearing in each of chords $j$. Equation 5 specifies output levels $\hat{e}_i$ in terms of decision levels $e_i$ and chord number $j$ for A-law encoding.

In contrast to the mu-law code, this particular A-law code has 14 chords, seven positive and seven negative. As in the mu-law code, decision level spacing is equal in the first chord for both positive and negative signals. Thus, this encoding scheme is commonly referred to as the 13 segment A-law code. Unlike the mu-law code, however, the A-law is a midriser compandor having a decision level rather than an output level, assigned the value zero. Moreover, in the A-law, the ABC bits do not represent individual chords. Since a chord is defined as a set of equally spaced output levels, chord $j=1$ in the A-law code is represented by ABC=000 for output levels $\hat{e}_0$ to $\hat{e}_{15}$ and by ABC=001 for output levels $\hat{e}_{16}$ to $\hat{e}_{31}$. Chords $j=2$ through $j=7$ in the A-law code are defined by the binary number represented by ABC=010 through ABC=111, respectively.

Interpretation of decision levels and output levels in the A-law code is similar to that for the mu-law. Specifically, an analog signal amplitude falling between decision levels $e_i$ and $e_{i+1}$ is represented by quantized amplitude $\hat{e}_i$. Amplitude $\hat{e}_i$ is represented by $i$, which in binary form is the transmitted A-law PCM signal. Consider the example $i=47$ (binary 101111), which represents any signal sample having an amplitude between 60 and 62 quantized to the value 61. Thus, any signal sample having an amplitude within the range 60 to 62 is encoded for transmission as an A-law code word SABCWXYZ=S0101111.

FIG. 7 depicts a summary of expanded digital code words for PCM code words occurring in the eight-bit A-law code. In the A-law code, the ABCWXYZ bits are also the same for both positive and negative signal samples. Differences between the mu-law code and the A-law code are readily discernible from a comparison of FIGS. 2 and 7.

Figure 8:
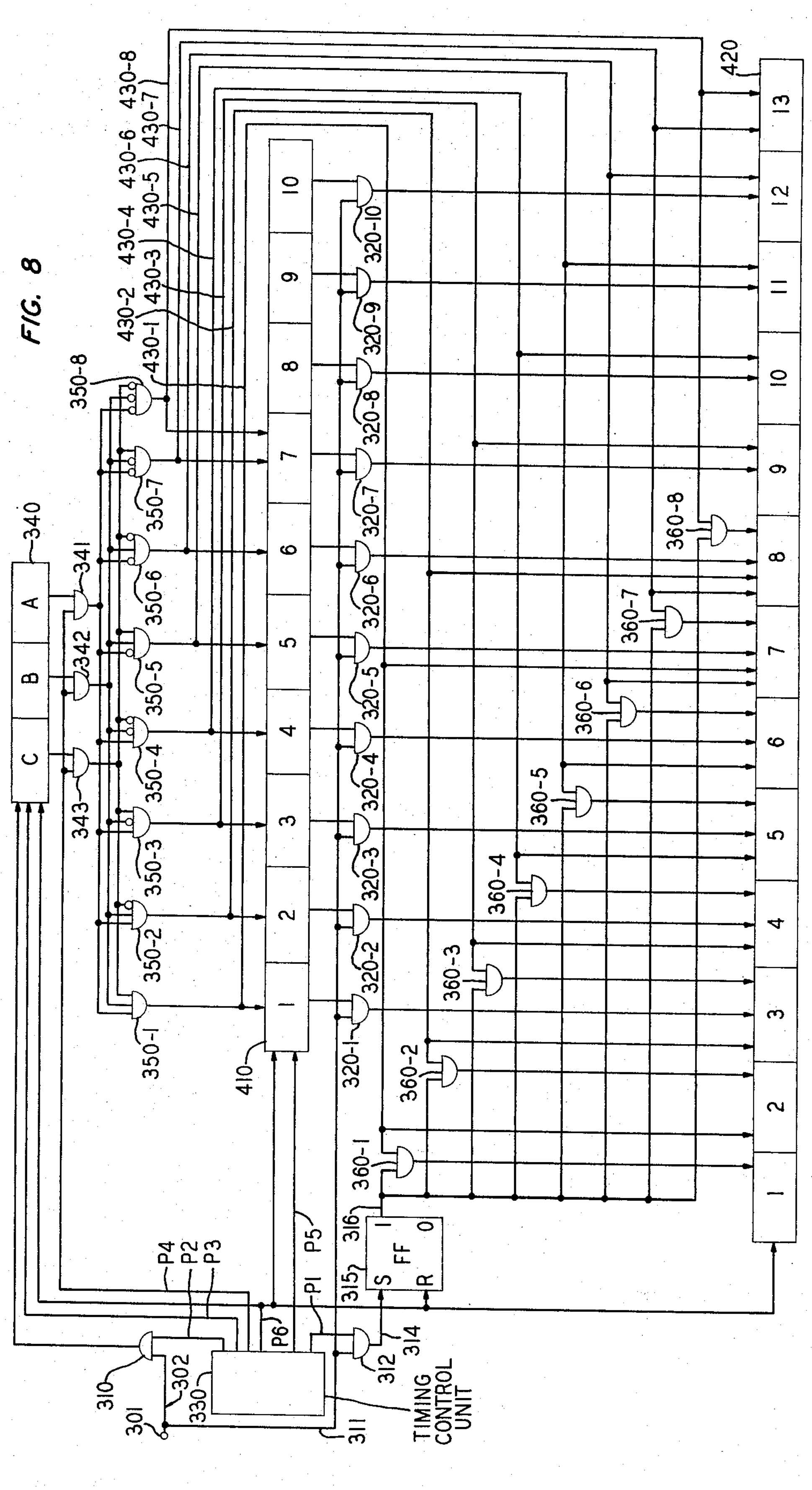
FIG. 8 depicts another expandor circuit illustrating a second embodiment of the invention for expanding A-law PCM code words.

FIG. 8 shows in simplified block diagram form a second system illustrating the present invention, which operates to expand eight-bit A-law PCM code words. The A-law expandor is somewhat similar to the mu-law expandor shown in FIG. 3. Therefore, similar circuit components are similarly numbered and will not be discussed again in great detail.

PCM code words to be expanded, including SABCWXYZ bits propagating in serial form, are supplied via terminal 301 and circuit path 302 to AND gate 310, and via circuit path 311 to AND gate 312 and AND gates 320. AND gate 312 operates to supply the logical signal in the S bit to flip-flop 315 where it is stored for later use. AND gate 310 operates to supply the logical signals in the ABC bits to register 340. The logical signals stored in register 340, in turn, are supplied via AND gates 341, 342 and 343 to logic gates 350. Control of the above-mentioned operations is effected by pulse signals generated in timing control unit 330. The timing sequence of the several pulse signals is shown in FIG. 4. Gates 350 operate to generate a control signal related to the binary number represented by the ABC bits. A summary of the outputs of 350 is shown in FIG. 5.

The major difference between the mu-law expandor of FIG. 3 and the A-law expandor shown in FIG. 8 is in the coupling circuits between the outputs of gates 350 and registers 410 and 420. Register 410 functions in essentially the same manner as shift register 370 of FIG. 3. One difference, however, is that the outputs from both of AND gates 350-7 and 350-8 (FIG. 8) are supplied to stage 7 of register 410. This of course is governed by the A-law expansion format. Stages 1-10 of shift register 410 are connected in a one-to-one relationship to AND gates 320-1 through 320-10. In turn, the outputs of AND gates 320-1 through 320-10 are connected in a one-to-one relationship to stages 3-12 of register 470. AND gates 320 operate in response to the control signal to supply logical signals in the WXYZ bits to selected stages of register 420 in accordance with the A-law expansion format shown in FIG. 7.

Another difference between the A-law expandor shown in FIG. 8 and the mu-law expandor shown in FIG. 3, is in the coupling between the outputs of gates 350 and the stages of storage register 420. In the A-law expandor shown in FIG. 8, the output of gate 350-1 is supplied via circuit path 430-1 to stages 2 and 7 of register 420 and to one input of AND gate 360-1. The output of gate 350-2 is supplied via circuit path 430-2 to stages 3 and 8 of register 420 and to one input of AND gate 360-2. The output of gate 350-3 is supplied via circuit path 430-3 to stages 4 and 9 of register 420 and to one input of AND gate 360-3. The output of gate 350-4 is supplied via circuit path 430-4 to stages 5 and 10 of register 430 and to one input of AND gate 360-4. The output of gate 350-5 is supplied via circuit path 430-5 to stages 6 and 11 of register 430 and to one input of AND gate 360-5. The output of gate 350-6 is supplied via circuit path 430-6 to stages 7 and 12 of register 420 and to one input of AND gate 360-6. The output of the gate 350-7 is supplied via circuit path 430-7 to stages 8 and 13 of register 420 and to one input of AND gate 360-7. Finally, the output of AND gate 350-8 is supplied via circuit path 390-8 to stage 9 of register 420 and to a one input of AND gate 360-8.

Circuit paths 430-1 through 430-8 are utilized to supply the control signal, which represents a logical 1, generated by gates 350 to selected stages of register 420 in accordance with the prescribed A-law expansion format. Circuit paths 430 also supply the control signal to AND gates 360, thereby making AND gates 360 operative to transfer the logical signal in the S bit position to a selected stage of register 420. Again, in those applications where the sign bit is externally carried, AND gates 360 may be eliminated. As shown in FIG. 8, a plurality of inputs are connected to individual ones of the stages of register 420. To provide isolation between these inputs, OR gates (not shown) are utilized which may be included in the individual stages of register 420. Except for the number of stages, register 420 is otherwise identical to register 380 of FIG. 3.

Operation of the invention in expanding A-law PCM code words is best explained by way of a simple example. Initially, register 340, 410 and 420 and flip-flop 315 are reset to a low state. That is to say, signals at the output of all the stages of registers 340, 410 and 420, and the output of flip-flop of 315 represent a logical 0. Assume that an A-law PCM code word SABCWXYZ=10101001 which represents the quantized signal value −41 is supplied in serial form to terminal 301 (FIG. 8) and then via circuit path 302 to AND gate 310 and via circuit path 311 to AND gates 320 and AND gate 312. Gate pulse P1 (FIG. 4) is supplied to AND gate 312 at the instant the S bit occurs. Therefore, the logical 1 in the S bit position is supplied via circuit path 314 to the SET input of flip-flop 315 causing the output of flip-flop 315 to go high, i.e., representative of a logical 1. In turn, the output of flip-flop 315 is supplied via circuit path 316 to one input of AND gates 360–1 through 360–8.

AND gate 310 operates in response to gate pulse P2 (FIG. 4) to supply the logical signals in the ABC bits, i.e., 010 to register 340. The ABC bits are advanced to appropriate stages of register 340 by shifting pulses P3 (FIG. 4). Then, the signals stored in register 340 are transferred via AND gates 341, 342 and in response to pulse P4 (FIG. 4) 343 to the inputs of logic gates 350–1 through 350–8. Since ABC=010, only gate 350–6 is operative to generate a control signal representative of a logical 1 at its output. The control signal, i.e., the logical 1 output of gate 350–6, is supplied to stage 6 of register 410, and via circuit path 430–6 to stages 7 and 12 of register 420 and to one input of AND gate 360–6. AND gate 360–6 is, therefore, made operative to supply the logical 1 in sign bit S to stage 6 of register 420.

The control signal stored in register 340 is used to transfer the logical signals in the WXYZ bit positions to selected stages of register 420. To this end, the logical 1 stored in stage 6 of register 410 is supplied to one input of AND gate 420–6. As can be observed from FIG. 4, AND gate 320–6 is made operative after the occurrence of the C bit and prior to the occurrence of the W bit. Accordingly, the logical 1 in the W bit position is transferred via AND gate 320–6 to stage 8 of register 420. Then, the logical 1 in register 420 is advanced by shifting pulses P5 (FIG. 4) one stage to the right, i.e., to stage 7 of register 410. This occurs between the W and X bit. Therefore, AND gate 320–7 is made operative to supply the logical signal in the X bit to stage 9 of register 420. In this example, there is a logical 0 in the X bit position. Accordingly, no signal is transferred via AND gate 320–7 and stage 9 of register 420 retains its initial state, i.e., a logical 0. The control signal stored in register 410 is advanced another stage to the right, and AND gate 320–8 is made operative to transfer the logical signal in the Y bit to stage 10 of register 420. Since the Y bit contains a logical 0 stage 10 of register 420 also retains its initial stage, i.e., a logical 0. Register 410 is again advanced to shift the control signal to stage 11. AND gate 320–9 is, therefore, made operative to transfer the logical 1 in the Z bit position to stage 11 of register 420. Thus, the A-law PCM code word is also expanded, in accordance with the invention, as the serial WXYZ bits are read directly into register 420.

In summary, signals representative of a logical 1 were supplied to stages 6–8, 11 and 18 of register 420, while no signals were supplied to stages 1–5 and 13 of register 420 which retain their initial 0 state. The logical signals stored in the register 420 represent the expanded A-law PCM code word S1WXYZ1.0=1110011.0 which corresponds to the transmitted A-law PCM code word SABCWXYZ=10101001 as shown in FIG. 7. The expanded A-law digital code word stored in register 420 is a linear code word. Thus, in the A-law there is no need for further processing to derive linear code words, as is required in the mu-law.

The above-described arrangements are of course merely illustrative of the application of the principles of the invention. Numerous other arrangements and variations may be devised by those skilled in the art without departing from the spirit and scope of the invention. For example, numerous logic arrangements may be employed for generating the control signal and for supplying the logical signals in the bits of the code word being expanded to the appropriate circuit locations in accordance with the expansion format being utilized. Indeed, the present invention could be employed for expanding digital code words in numerous other companding schemes without deviating from the present invention.

What is claimed is:

1. A circuit for expanding a digital code word having a plurality of serial bits which represent a quantity in a nonlinear code scheme which comprises, storage means having a plurality of stages, means supplied with logical signals from predetermined ones of the bits in series of the digital code word being expanded for generating a control signal, first means supplied with said control signal for supplying a predetermined logical signal into at least one of the stages of said storage means, said at least one stage being determined in accordance with a prescribed relationship of the logical signals from said predetermined bits, a plurality of controllable means responsive to said control signal for serially supplying the logical signals from the remaining ones of the serial bits of said digital code word in a one-to-one relationship into others of the stages of said storage means in accordance with a prescribed expansion format, and means for selectively supplying said control signal sequentially to individual ones of said controllable means in accordance with the expansion format at instants concurrent with the occurrence of the individual ones of said remaining serial bits so that the individual ones of the logical signals from said remaining serial bits are serially supplied directly into said other stages of said storage means substantially instantaneously as they are supplied to the expanding circuit, wherein the digital code word is expanded as the logical signals in said remaining bits are serially supplied directly into said other stages of said storage means.

2. A circuit as defined in claim 1 wherein said control signal generating means includes a plurality of first logic gates each having a plurality of inputs and an output, each of said first logic gates being responsive to an individual group of logical signals from said predetermined bits representing a predetermined binary number for generating a predetermined logical signal at its output.

3. A circuit as defined in claim 2 wherein said control signal generating means further includes a serial-to-parallel converter having a plurality of outputs, said converter outputs being in circuit with the inputs of said first logic gates, and controllable gate means for serially supplying the logical signals from said predetermined bits to said serial-to-parallel converter.

4. A circuit as defined in claim 1 wherein said means for selectively supplying the control signal to said plurality of controllable means includes a first shift register having a plurality of stages, and wherein said control signal generating means includes means for supplying said control signal initially to a selected stage of said first shift register, said first shift register stage being determined in accordance with a prescribed relationship based on the binary value of the logical signals from said predetermined bits.

5. A circuit as defined in claim 4 wherein said means for supplying said control signal to said first shift register further includes a plurality of first logic gates each having a plurality of inputs and an output, and means for simultaneously supplying the logical signal from said predetermined bits to the inputs of said first logic gates, each of said first logic gates being responsive to an individual group of logical signals from said predetermined bits representing a preassigned binary number for generating a predetermined logical signal at its output.

6. A circuit as defined in claim 5 wherein said control signal generating means further includes a second shift register having a plurality of stages, each of said second shift register stages having an output, first controllable gate means for serially supplying only the logical signals from said predetermined bits to said second shift register, and wherein said simultaneous supplying means includes a plurality of second controllable gate means in a one-to-one circuit relationship with the outputs of the stages of said second shift register and in predetermined circuit relationship with the inputs of said first logic gates.

7. A circuit as defined in claim 6 wherein each of said controllable means is a logic gate having a plurality of inputs and an output, each of said logic gates having one input connected in a one-to-one circuit relationship with the output of a predetermined stage of said first shift register, another input being supplied with the logical signals from the bits of the digital code word being expanded in serial form and its output being connected in a predetermined circuit relationship with a predetermined stage of said storage means, each of said logic gates being inhibited from supplying the logical signals from the bits of the digital code word being expanded to the stages of said storage means until said control signal is supplied to an input thereof.

8. A circuit as defined in claim 7 wherein said first means includes a plurality of circuit means in a one-to-one circuit relationship with the outputs of said first logic gates for supplying the logical signal generated by said first logic gates to at least one of the stages of said storage means, said at least one stage of said storage means being determined in accordance with a predetermined relationship based on the binary value of the logical signals from said predetermined bits of the digital code word being expanded.

9. A circuit as defined in claim 8 further including means in circuit with predetermined ones of said circuit means for supplying the logical signal carried by individual ones of said circuit means to subsequent others of the stages of said storage means.

10. A circuit as defined in claim 9 further including means for generating a sequence of timing signals, a predetermined one of said timing signals being supplied to said storage means, said first shift register and said second shift register for setting the stages of said storage means, said first shift register and said second shift register to a predetermined logical state, predetermined ones of said timing signals being supplied to said first controllable gate means for serially supplying only the logical signals in said predetermined bits to said second shift register, a predetermined one of said timing signals being supplied to said second controllable gate means for effecting the transfer of the logical signals in said predetermined bits from the stages of said second shift register to the inputs of said first logic gates, and predetermined ones of said timing signals being supplied to said first shift register for advancing said control signal to subsequent ones of the stages of said first shift register, said control signal being in the individual ones of said first shift register stages concurrently with the individual ones of said remaining serial bits in accordance with said prescribed expansion format so that the remaining ones of said serial code word bits are seraill supplied into stages of said storage means.

11. A digital circuit for expanding a digital code word having a plurality of bits which represent a quantity in a compressed code scheme which comprises, first storage means having a plurality of stages, a serial-to-parallel converter having a plurality of stages, first controllable means for serially supplying logical signals in predetermined ones of the bits of the digital code word being expanded to said serial-to-parallel converter, a shift register having a plurality of stages, each of said stages having an output, a plurality of first logical gates each having a plurality of inputs and an output, the inputs of said first logic gates being in predetermined circuit relationship with the stages of said serial-to-parallel converter, each one of said first logic gates being responsive to an individual predetermined group of logical signals in said predetermined bits to generate a predetermined logical signal at its output only when the logical signals in said predetermined bits have a binary value assigned to said one of said first logic gates, the output of each said first logic gates being in a predetermined circuit relationship with a predetermined stage of said shift register for supplying the logical signal generated at one of the outputs of said first logic gates to one of the stages of said shift register, said shift register stage being determined in accordance with a predetermined relationship of the logical signals from said predetermined bits, second controllable means for simultaneously supplying the logical signals for said serial-to-parallel converter to the inputs of said first logic gates at a predetermined instant, a plurality of second logic gates each having a plurality of inputs and an output, each of said second logic gates having one input connected in a one-to-one circuit relationship with an output of an individual one of the stages of said shift register, another input being supplied serially with logical signals from the bits of the digital code word being expanded in serial form and its output being connected in a one-to-one circuit relationship with a predetermined one of the stages of said first storage means, circuit means for supplying signals developed at the outputs of said first logic gates to others of the stages of said first storage means in accordance with a prescribed expansion format, and means for generating a sequence of timing signals, a predetermined one of said timing signals being supplied to said serial-to-parallel converter, said shift register and said first storage means for setting the stages of said serial-to-parallel converter, said shift register and said first storage means to a predetermined logical state, predetermined others of said timing signals being supplied to said first controllable means for effecting the serial supply of the logical signals in said predetermined bits to said serial-to-parallel converter, a predetermined one of said timing signals being supplied to said second controllable means for effecting the transfer of the logical signals from said serial-to-parallel converter to the inputs of said first logic gates and predetermined ones of said timing signals being supplied to said shift register for advancing said shift register to shift the signal supplied to a stage of said shift register to subsequent stages thereof, said signal supplied to said shift register being in the individual ones of said shift register stages concurrently with the individual ones of said remaining serial bits in accordance with said expansion format so that the serial digital code word is expanded as the logical signals in the remaining ones of the bits of said code word as serially supplied directly into selected stages of said first storage means.

12. A circuit as defined in claim 11 further including second storage means supplied with the logical signal in a predetermined one of the bits of the digital code word being expanded.

13. A circuit as defined in claim 12 further including means responsive to the signal generated by said first logic gates in combination with the logical signal stored in said second storage means for supplying the logical signal in said predetermined bit into a predetermined stage of said first storage means in accordance with said expansion format.

* * * * *